United States Patent

Shannon et al.

[11] Patent Number: 6,006,721
[45] Date of Patent: Dec. 28, 1999

[54] MODULAR INTAKE PORT FOR AN INTERNAL COMBUSTION ENGINE

[75] Inventors: Ben Shannon, Fenton; Gary A. Vrsek, Brighton, both of Mich.

[73] Assignee: Ford Global Technologies, Inc., Dearborn, Mich.

[21] Appl. No.: 08/663,505

[22] Filed: Jun. 14, 1996

[51] Int. Cl.⁶ ............................. F02B 31/04; F02M 35/10
[52] U.S. Cl. ...................................... 123/306; 123/188.14
[58] Field of Search ............................... 123/306, 188.14

[56] References Cited

U.S. PATENT DOCUMENTS

| | | | |
|---|---|---|---|
| 1,866,703 | 7/1932 | Gehres | 123/306 |
| 4,308,829 | 1/1982 | Yamada et al. | 123/308 |
| 4,336,777 | 6/1982 | Yanagihara et al. | 123/306 |
| 4,669,434 | 6/1987 | Okumura | 123/308 |
| 4,704,996 | 11/1987 | Morikawa | 123/306 |
| 4,785,890 | 11/1988 | Wyczalek et al. | 123/188 M |
| 4,827,883 | 5/1989 | Khalighi et al. | 123/308 |
| 4,884,040 | 11/1989 | Leighton et al. | 123/306 |
| 5,231,964 | 8/1993 | Harada | 123/306 |
| 5,474,044 | 12/1995 | Matterazzo et al. | 123/306 |
| 5,487,365 | 1/1996 | Isaka | 123/306 |
| 5,535,717 | 7/1996 | Rygiel | 123/306 |
| 5,564,383 | 10/1996 | Isaka et al. | 123/306 |
| 5,564,384 | 10/1996 | Oshuga et al. | 123/306 |

FOREIGN PATENT DOCUMENTS

| | | | |
|---|---|---|---|
| 527743 | 6/1931 | Germany | 123/306 |
| 1032972 | 6/1958 | Germany | 123/306 |
| 2012436 | 11/1970 | Germany | 123/188 M |
| 1518560 | 10/1989 | Russian Federation | 123/306 |
| 1518560 | 10/1989 | United Kingdom | 123/306 |

*Primary Examiner*—Henry C. Yuen
*Attorney, Agent, or Firm*—Donald A. Wilkinson

[57] ABSTRACT

An intake system for an internal combustion engine wherein an intake conduit (16) within a cylinder head (14) is configured to receive a vane control module (24). The vane control module (24) includes a vane (34) mounted within an airflow conduit (30). An actuator (36) pivots the vane (34) to different positions depending upon engine operating conditions. Under high load engine operating conditions, with the vane (34) in a fully retracted position, minimum restriction to the fluid flow is achieved, and in-cylinder tumble flow is created due to the shape and orientation of the vane 34. Under low load engine operating conditions, with the vane (34) in an extended position, the vane (34) causes a redirection of the fluid in order to create a swirl flow pattern in the cylinder (12).

10 Claims, 2 Drawing Sheets

6,006,721

MODULAR INTAKE PORT FOR AN INTERNAL COMBUSTION ENGINE

FIELD OF THE INVENTION

The present invention relates to the air intake ports for internal combustion engines and more particularly to selectively variable geometries for intake ports.

BACKGROUND OF THE INVENTION

The power which can be delivered by an internal combustion engine is limited by the rate at which it can take in air, combine it with fuel and reject the products. A concern, then, arises with effective breathing (i.e., taking in sufficient air) for high engine load conditions. Further, with a strong emphasis on increasing fuel economy and decreasing certain emissions in the exhaust, the operation of the internal combustion engines under light and medium load conditions is also critical, where the way in which the breathing is accomplished is important. Thus, an automotive internal combustion engine can be considered as a multiapplication machine, which requires variable design considerations in order to achieve the optimum performance throughout its wide range of operating speeds and loads.

The inlet conduit to each cylinder, including the intake valve and throat region, is one of the most important areas influencing the engine's volumetric efficiency and combustion burn rate. For high load conditions, if the inlet conduit is correctly designed, it will reduce intercyclic combustion variation through high gas velocities, tumble fluid motion during the cylinder filling process and, hence, higher turbulent intensity with improvement in exhaust gas recirculation (EGR) tolerance, specific fuel consumption and specific power output. The term tumble is used herein to refer to spin in the generally vertical direction in the cylinder, and is used in high flow rate situations.

For reasons of increased burn rate at low speed, low load engine conditions, it is desirable to promote some type of in-cylinder fluid motion. This in-cylinder fluid motion (in-cylinder flow field), the conventional swirl rotation around the cylinder axis (horizontal swirl) generates intake fluid motion to extend the lean capability (improved lean burn capability by having a high air/fuel ratio) of the engine while still maintaining its integrity at full load performance.

Some prior art engine intake configurations have addressed the concerns with adequate swirl in the cylinder at low to moderate engine load conditions by placing vanes in the fluid stream in the vicinity of the intake port. However, these vanes at high load conditions then act to partially block the flow path and restrict the amount of fluid that can flow into the cylinder, thus limiting the maximum power. Further, the vanes will still direct the fluid flow to create swirl rather than a tumble flow field in the cylinder for these high load engine operating conditions.

As used herein, the reference to fluid flow in the intake system can mean just air or an air/fuel mixture depending upon where the fuel is injected into the air stream. The point at which the fuel is injected into the intake system is not directly relevant to the present invention.

SUMMARY OF THE INVENTION

In its embodiments, the present invention contemplates a cylinder head assembly of an internal combustion engine, the engine having at least one cylinder. The cylinder head assembly comprises a cylinder head having an inlet conduit, with the inlet conduit having an entrance region and a port region, and an intake valve mounted within the cylinder head and movable to selectively block fluid flow through the port region. A vane is mounted within the entrance region and selectively movable therein to restrict and redirect fluid flow through the port region.

The present invention further contemplates a method of controlling the flow of fluid through an intake conduit of a cylinder in an internal combustion engine, the engine capable of operating at low, medium and high load conditions. The method comprises the steps of: Providing a vane movable within the intake conduit; drawing fluid into the cylinder through the intake conduit; and selectively moving the vane in the intake conduit whereby at certain high load engine operating conditions, the vane is moved to minimize the restriction of flow in the inlet conduit and cause a tumble motion in the cylinder.

Accordingly, an object of the present invention is to provide a variable intake port design to produce optimum control of the burn rate in the cylinder while maintaining high specific torque and horsepower output from the engine.

An advantage of the present invention is that it allows the production of high fluid swirl about the cylinder axis at low to moderate speed/load conditions and a tumble in-cylinder fluid flow field at full load performance, thereby increasing the overall engine efficiency for a broad range of operating conditions.

A further advantage of the present invention is that it allows for reduced idle RPMs while still having adequate idle quality because of the swirl flow field at low load conditions.

An additional advantage of the present invention is that while a vane provides adequate directional fluid control during low to medium flow conditions, it does not restrict fluid flow during high flow conditions, thus, avoiding some design trade-offs for the optimal air flow at the various engine operating conditions.

BRIEF DESCRIPTION OF THE DRAWINGS

FIG. 7 is a perspective view of an alternate embodiment of the present invention illustrating a two intake valve per cylinder design;

FIG. 8 is a perspective view illustrating the alternate embodiment of FIG. 7 from a different perspective;

FIG. 9 is a perspective view of a second alternate embodiment of the present invention illustrating a three intake valve per cylinder configuration; and FIG. 10 is a perspective view illustrating the second alternate embodiment of FIG. 9 from a different perspective.

DETAILED DESCRIPTION OF THE PREFERRED EMBODIMENTS

Figure 1:
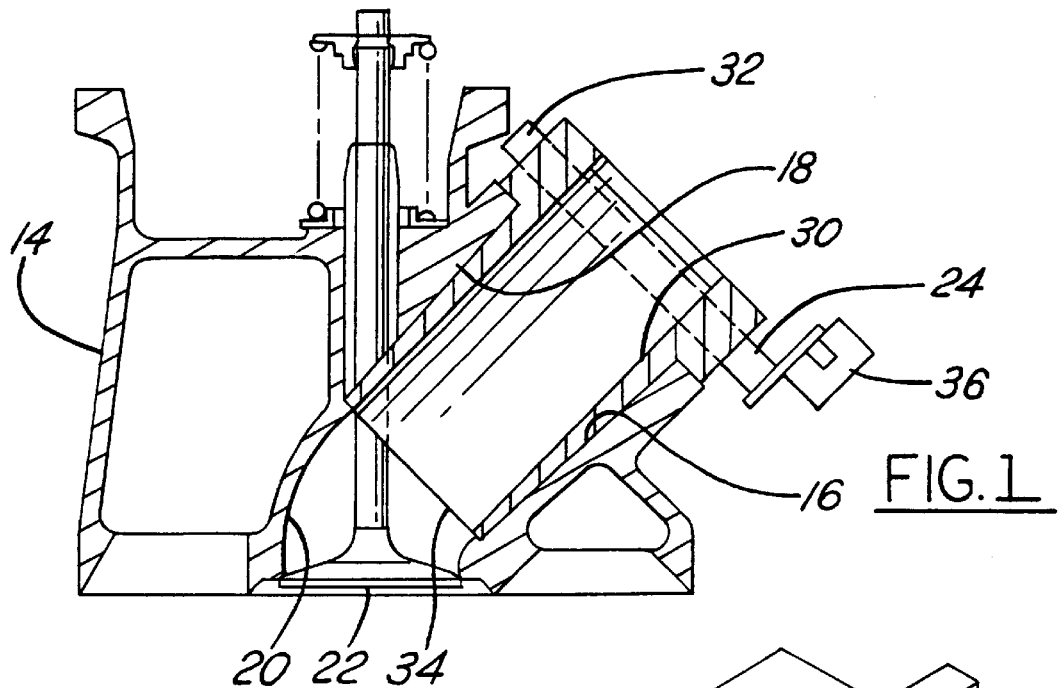
FIG. 1 is a side, partial sectional, partially schematic view of an intake assembly in a cylinder head of an engine, in accordance with the present invention.
Figure 2:
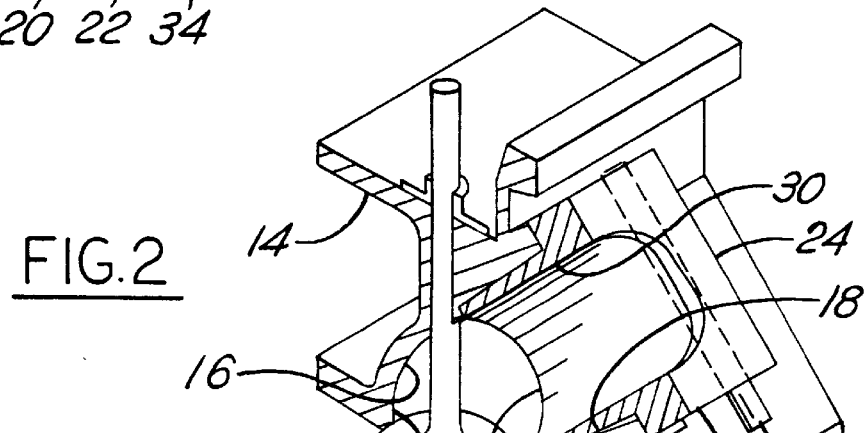
FIG. 2 is a perspective, partial sectional view of the intake assembly of FIG. 1.
Figure 4:
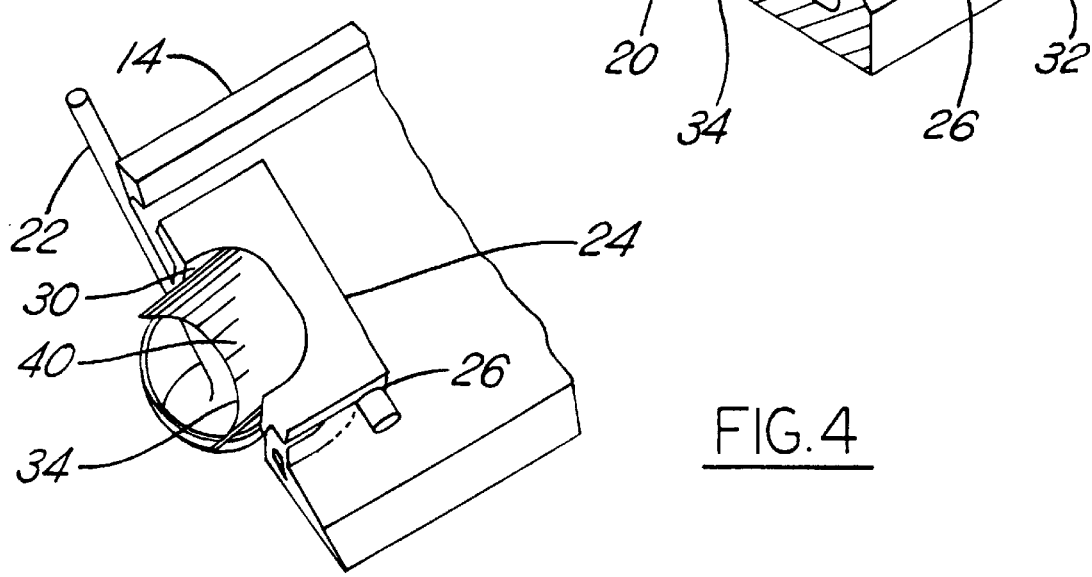
FIG. 4 is another perspective view of the intake assembly of FIG. 1 with the vane shown in a partially open position.
Figure 3:
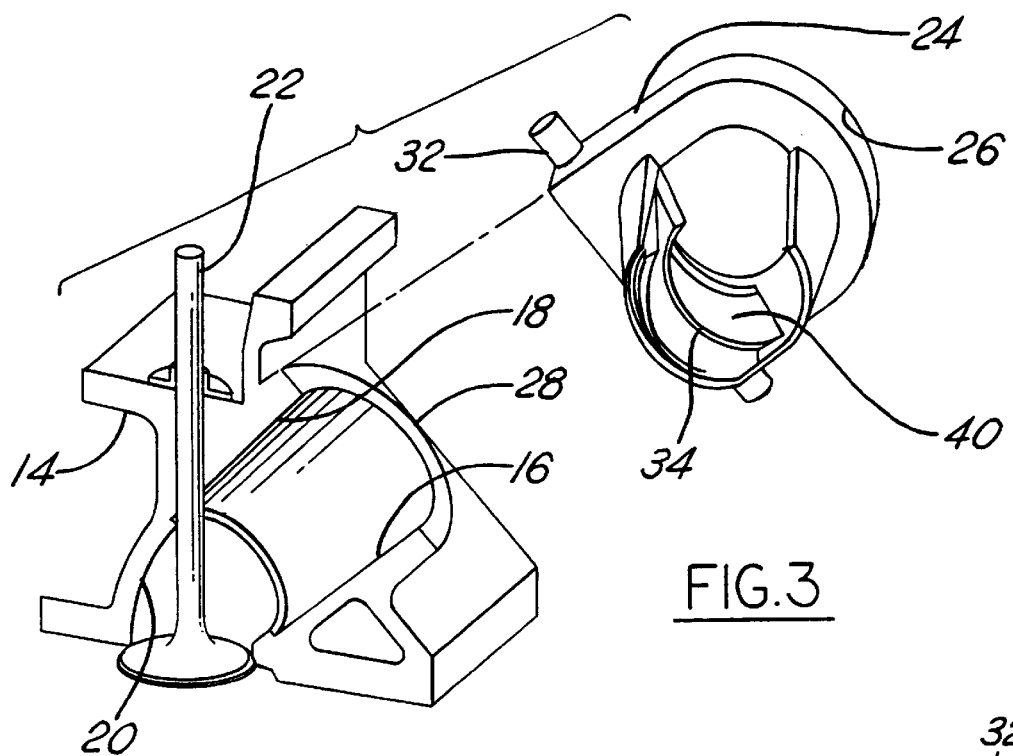
FIG. 3 is a perspective, partially exploded view, similar to FIG. 2, with the control module shown removed and rotated to show a bottom view of the control module.
Figure 5:
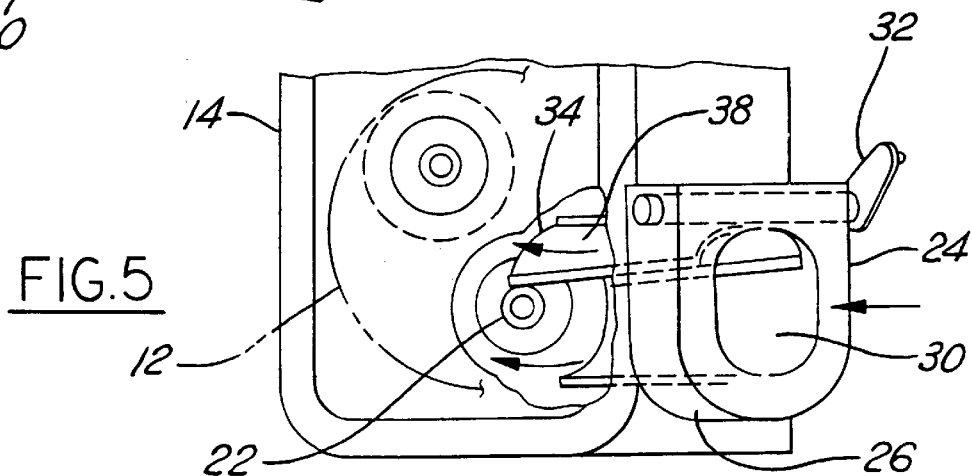
FIG. 5 is a top view of the intake assembly of FIG. 1, with the vane shown in a fully closed (retracted) position.
Figure 6:
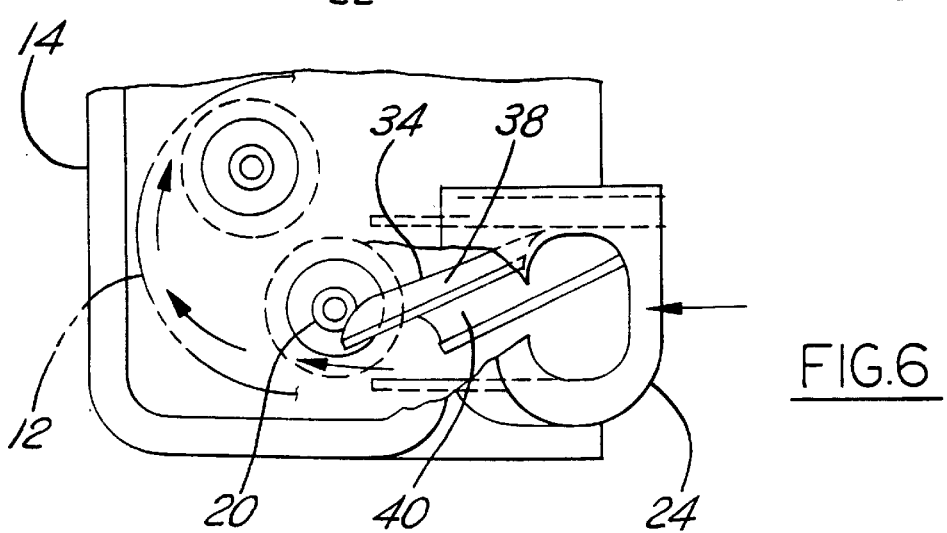
FIG. 6 is a view similar to FIG. 5, with the vane shown in a mostly open (extended) position.

The first embodiment of this invention is illustrated in FIGS. 1–6. A typical internal combustion engine includes at least one cylinder 12 formed within a typical cylinder block. Mounted on top of the cylinder block is a cylinder head 14. One of the conventional functions performed within the cylinder head 14 is to provide a path for fluid (air or an air/fuel mixture) into the cylinder 12. An intake conduit 16 extends through the cylinder head 14 to the cylinder 12; it includes an entrance region 18 upstream, and a port region 20 downstream. A typical intake valve 22 is mounted in the cylinder head 14 and can be reciprocated to selectively block the flow through the port region 20.

A vane control module 24 mounts within the entrance region 18. The vane control module 24 includes a mounting flange 26, which abuts a lip 28 on the intake conduit 16, and an airflow conduit 30, which extends within a portion of the entrance region 18. An arm 32 is supported by the mounting flange and is rotatable relative to it. A vane 34 is mounted to the arm 32 within the airflow conduit 30, and an actuator 36, illustrate schematically in FIG. 1, is coupled to the arm 32. The actuator 36 acts to pivot the arm 32, thus controlling the motion of the vane 34 within the airflow conduit 30. The actuator 36 can be mechanical or electrical, such as a typical mechanism for plate deactivation in a four valve engine. Also, preferably, the actuator 36 allows for movement so that the vane position in the airflow conduit 30 is continuously variable, although it could also be controlled by limiting the movements to a few discrete positions.

The outer surface 38 of the vane 34 generally conforms to the shape of the airflow conduit 30 in order to allow it to be moved as much out of the flow stream as possible; this will maximize the area of the opening and thus maximize the amount of flow under maximum engine load conditions. On the other hand, the inner surface 40 of the vane 34 need not have the same curvature, allowing for design flexibility in creating the optimal flow patterns. Further, a modular design allows for generally more accurate forming of the control module 24, which contributes to a more even cylinder-to-cylinder air distribution.

Preferably, the cylinder head entrance region 18 and port region 20 are die cast in order to maintain good tolerances to accept the control module 24, which is preferably pre-assembled for ease of installation. With the cylinder head 14 and control module 24 being separate, the control module 24 can be made of plastic or other suitable material instead of a metal, as the cylinder head 14 typically is. This allows for ease of manufacturability and assembly and also allows for ease of design changes for engines with varying needs; e.g., different modules can be made with different vane shapes to apply to the different applications of the particular base engine design.

The operation of the system will now be described. With the engine running, a typical on-board computer (not shown) monitors various engine parameters and determines the load demand on the engine. This computer is in communication with the actuator 36. There can be a single actuator controlling the control modules 24 for every cylinder 12 in the engine or, each control module 24 can have its own actuator 36, depending upon the advantages and costs associated with that particular engine. For this description, one cylinder will be discussed although it is understood that this invention applies to all cylinders in the engine.

If a high load condition is sensed by the computer, such as a wide open throttle condition, the actuator 36 will be activated to rotate the arm 32, and consequently the vane 34, so that the vane 34 is fully closed (i.e., fully retracted such that the outer vane surface 38 is against the airflow conduit 30). See FIG. 5. This allows for minimum restriction of fluid flow into the cylinder 12. Further, the radial orientation and shape of the inner vane surface 40 is such that, at this vane position, it will direct the fluid flow through the port region 20, around the intake valve 22 and into the cylinder in such a manner that a tumble flow field will develop in the cylinder. In this way, not only is the maximum airflow attained, but good mixing of the fluid will occur for this high engine load condition.

If a very low load condition is sensed by the computer, such as an engine idle condition, the actuator 36 will be activated to rotate the arm 32, and consequently the vane 34, so that the vane 34 is close to fully open (i.e., almost fully extended such that the outer vane surface 38 extends substantially away from the airflow conduit 30). See FIG. 6. This allows for a high restriction of fluid flow into the cylinder 12. This restriction in the fluid flow path will not adversely affect the engine operation since a substantially lesser amount of fluid is needed for this operating mode anyway. Even thought the radial orientation and shape of the vane 34 does not change between the high load and low load conditions, the change in orientation of the vane 34 will re-direct the flow of fluid into the cylinder 12 in such a manner that the flow will enter the cylinder 12 and create a generally swirl flow field. This swirling motion helps to improve the combustion for this low load engine condition.

For medium engine load conditions, the actuator 36 will locate the vane 34 in some position between fully closed and fully open. The amount of opening will depend upon differing operating conditions and engine configurations and so will vary from one type of vehicle/engine combination to another. Thus, the vane position not only restricts the flow under certain operating conditions, but allows the flow pattern in the cylinder 12 to be better optimized for that particular engine operating condition.

This invention applies to engines with different numbers of intake valves. For example, one way to control an engine with two intake valves per cylinder is to design vanes for each of the intake valves and control them separately. However, in a four valve engine (i.e., two intake valves per cylinder), in order to minimize the components and space required, one vane 34' can be used to control the fluid flow to both intake valves 22'. See FIGS. 7 and 8 for an illustration of this alternate embodiment. In this embodiment, elements which are similar to the first embodiment that have been modified somewhat will be designated with a similar numeral, but with an added prime.

In this embodiment, one larger intake conduit 16' extends through the cylinder head 14' and feeds fluid to both intake valves 22'. A single control module 24' is received in the intake conduit 16', and has a single vane 34' pivotally mounted within its airflow conduit 30'. The vane 34' is illustrated in FIGS. 7 and 8 in the fifty percent open position and also shown in phantom in the fully closed and seventy five percent open positions. The shape of the inner vane surface 40' and amount of rotation for a given engine load condition, then, take into account the two intake valve configuration when determined.

A further alternative is shown in FIGS. 9 and 10 where a five valve per cylinder (three intake valves) engine configuration is illustrated. This is similar to that shown in FIGS. 7 and 8, the main difference being a third intake valve 22".

While this design is generally directed to four stroke gasoline internal combustion engines, it may also be applied to two stroke diesel engines. Moreover, although a modular vane is illustrated and is preferred, the vane can be directly installed in the cylinder head inlet conduit without it being part of a modular design, if so desired.

While certain embodiments of the present invention have been described in detail, those familiar with the art to which this invention relates will recognize various alternative designs and embodiments for practicing the invention as defined by the following claims.

We claim:

1. A cylinder head assembly of an internal combustion engine, the engine having at least one cylinder, the cylinder head assembly comprising:
    a cylinder head member having an inlet conduit, with the inlet conduit having an entrance region and a port region, and with the entrance region formed by a modular insert mounted into the cylinder head member;
    an intake valve mounted within the cylinder head member and movable to selectively block fluid flow through the port region; and
    a vane, rotatably mounted to the modular insert within the entrance region and selectively movable therein to restrict and redirect fluid flow through the port region.

2. The cylinder head assembly of claim 1 further including actuator means for selectively moving and maintaining the position of the vane.

3. The cylinder head assembly of claim 1 wherein the vane is shaped and oriented in the entrance region such when the vane is in a substantially closed position, tumble in the fluid flowing within the engine cylinder will occur.

4. The cylinder head assembly of claim 3 wherein the vane shape and orientation is such that when the vane is in a mostly open position, swirl in the fluid flowing within the cylinder will occur.

5. The cylinder head assembly of claim 1 further including a second intake valve mounted within the cylinder head and movable to selectively block fluid flow through the port region.

6. The cylinder head assembly of claim 5 further including a third intake valve mounted within the cylinder head and movable to selectively block fluid flow through the port region.

7. An internal combustion engine comprising:
    a cylinder;
    a cylinder head member having an inlet conduit, with the inlet conduit having an entrance region and a port region;
    an intake valve mounted within the cylinder head member and movable to selectively block fluid flow through the port region; and
    a modular insert including an entrance region insert portion mounted into the cylinder head, and a vane mounted to the entrance region insert portion, the vane selectively movable therein to restrict and redirect fluid flow through the port region.

8. The internal combustion engine of claim 7 further including actuator means for selectively moving and maintaining the position of the vane.

9. The internal combustion engine of claim 8 wherein the vane is shaped and oriented in the entrance region such when the vane is in a substantially closed position, tumble in the fluid flowing within the engine cylinder will occur.

10. The internal combustion engine of claim 9 wherein the vane shape and orientation is such that when the vane is in a mostly open position, swirl in the fluid flowing within the cylinder will occur.

* * * * *